US008782374B2

(12) United States Patent
Rappoport et al.

(10) Patent No.: US 8,782,374 B2
(45) Date of Patent: Jul. 15, 2014

(54) METHOD AND APPARATUS FOR INCLUSION OF TLB ENTRIES IN A MICRO-OP CACHE OF A PROCESSOR

(75) Inventors: Lihu Rappoport, Haifa (IL); Chen Koren, Haifa (IL); Franck Sala, Haifa (IL); Oded Lempel, Moshav Amikam (IL); Ido Ouziel, Haifa (IL); Ron Gabor, Raanana (IL); Gregory Pribush, Haifa (IL); Lior Libis, Haifa (IL)

(73) Assignee: Intel Corporation, Santa Clara, CA (US)

( * ) Notice: Subject to any disclaimer, the term of this patent is extended or adjusted under 35 U.S.C. 154(b) by 844 days.

(21) Appl. No.: 12/326,882

(22) Filed: Dec. 2, 2008

(65) Prior Publication Data
US 2010/0138610 A1    Jun. 3, 2010

(51) Int. Cl.
  *G06F 12/00*      (2006.01)
  *G06F 13/00*      (2006.01)
  *G06F 12/10*      (2006.01)

(52) U.S. Cl.
  CPC ...... *G06F 12/1027* (2013.01); *G06F 2212/652* (2013.01); *G06F 12/1036* (2013.01)
  USPC ........................................................ 711/205

(58) Field of Classification Search
  USPC ........................................................ 711/205
  See application file for complete search history.

(56) References Cited

U.S. PATENT DOCUMENTS

| 5,369,753 | A  | * | 11/1994 | Tipley ........................... 711/122 |
| 5,584,037 | A  | * | 12/1996 | Papworth et al. ............... 712/23 |
| 5,687,338 | A  | * | 11/1997 | Boggs et al. .................... 712/205 |
| 5,721,855 | A  | * | 2/1998  | Hinton et al. .................. 712/218 |
| 5,809,271 | A  | * | 9/1998  | Colwell et al. ................. 712/208 |
| 6,467,027 | B1 | * | 10/2002 | Kyker et al. ................... 711/125 |
| 7,334,115 | B1 | * | 2/2008  | D'Sa et al. .................... 712/239 |

* cited by examiner

*Primary Examiner* — Matthew Bradley
*Assistant Examiner* — Craig Goldschmidt
(74) *Attorney, Agent, or Firm* — Trop, Pruner & Hu, P.C.

(57) ABSTRACT

Methods and apparatus for inclusion of TLB (translation look-aside buffer) in processor micro-op caches are disclosed. Some embodiments for inclusion of TLB entries have micro-op cache inclusion fields, which are set responsive to accessing the TLB entry. Inclusion logic may the flush the micro-op cache or portions of the micro-op cache and clear corresponding inclusion fields responsive to a replacement or invalidation of a TLB entry whenever its associated inclusion field had been set. Front-end processor state may also be cleared and instructions refetched when replacement resulted from a TLB miss.

20 Claims, 7 Drawing Sheets

METHOD AND APPARATUS FOR INCLUSION OF TLB ENTRIES IN A MICRO-OP CACHE OF A PROCESSOR

FIELD OF THE DISCLOSURE

This disclosure relates generally to the field of microprocessors. In particular, the disclosure relates to novel techniques for handling inclusion and instruction restarts in a micro-op cache for a processor.

BACKGROUND OF THE DISCLOSURE

In some modern processors, instructions have variable lengths and form a complex instruction set capable of complex tasks that may involve multiple simpler tasks, thus the term complex instruction set computers (CISC). Micro-operations, also known as a micro-ops or uops, are simpler internal instructions that can be produced by decoding the more complex instructions, also referred to as macroinstructions.

Execution pipelines are often used. Instructions are provided to the front end of the pipeline by various arrays, buffers, and caches and micro-ops are prepared and queued for execution. Such front-end arrays that contain instruction lines, may also include self-modifying code (SMC) bits to detect which instruction lines may have been overwritten by self-modifying or cross-modifying code.

For high performance processors that use these variable length instructions, the decoding process can be costly in terms of circuitry, power consumption and time. Some processors try to alleviate one or more of these costs through saving or caching the decoded micro-ops to reuse them if execution of their corresponding macroinstructions is repeated.

One technique is called a micro-op cache or microcode cache, where micro-ops are stored in cache lines (or ways) and tags associated with instruction pointers are used to lookup the micro-ops directly rather than decoding the corresponding macro-instruction each time. Some such micro-op caches are discussed, for example, in U.S. Pat. No. 6,950,903. Micro-op caches may be less costly and more power efficient than fetching and decoding macro-instructions.

It will be appreciated that for correct functionality considerations such as processor inclusion, any instruction line, for which micro-ops have been delivered into the execution pipeline may later need to be re-delivered in an unmodified state. Therefore, deallocation or eviction of the line, in particular from an instruction cache, cannot take place until all instructions from that line are no longer being processed in the execution pipeline.

One technique to protect such instruction lines from being evicted is to employ a victim cache to hold evicted lines until it can be determined that no instructions from that line are being processed in the execution pipeline. One way to make such a determination is to insert a special micro-op into the pipeline when an entry is allocated into the victim cache. As lone as new instruction fetches from the victim cache are not permitted, then when that micro-op retires in sequential order, any instructions from the evicted line that were in front of the special micro-op will have been retired as well and the corresponding entry can be deallocated from the victim cache.

Since the steps involved in decoding the variable length macroinstructions may be avoided, micro-op caches can potentially increase processor performance, but such consideration as processor inclusion, self-modifying or cross-modifying code, instruction restarts and synchronization between sequences of decoded macroinstructions and cached micro-ops can be complicated and may degrade those performance increases. To date, the range of effective techniques for employing saved or cached micro-ops to improve processing of instructions and reduce costs in terms of circuit complexity and power consumption while also handling the complicated issues of inclusion and instruction restarts in a processor have not been fully explored.

BRIEF DESCRIPTION OF THE DRAWINGS

The present invention is illustrated by way of example and not limitation in the figures of the accompanying drawings.

DETAILED DESCRIPTION

Methods and apparatus for instruction restarts and inclusion in processor micro-op caches are disclosed herein. In some embodiments, micro-op cache lines have way storage fields to record the instruction-cache ways that store corresponding macroinstructions. Instruction-cache in-use indications associated with instruction cache lines containing the instructions are updated upon micro-op cache hits to indicate that the associated instructions are in use. In-use indications can be located for updates in the instruction-cache using the recorded instruction-cache ways in micro-op cache lines. Victim-cache deallocation micro-ops are enqueued in a micro-op queue after micro-op cache miss synchronizations, which are forced responsive to line evictions from the instruction-cache into the victim-cache. Inclusion logic also locates and evicts the micro-op cache lines corresponding to the recorded instruction-cache ways, responsive to evictions from the instruction-cache.

In some alternative embodiments a synchronization flag may be set in the last micro-op retrieved from the micro-op cache data array responsive to a subsequent micro-op cache miss to indicate where micro-ops from the macroinstruction translation engine are to be merged with micro-ops retrieved from the micro-op cache data array, to supply the micro-op queue. Similarly, a synchronization flag may also be set in the last micro-op from the macroinstruction translation engine in response to a subsequent micro-op cache hit.

Some embodiments for inclusion of TLB (translation look-aside buffer) entries have micro-op cache inclusion fields, which are set responsive to accessing the TLB entry. Inclusion logic may then flush the micro-op cache or portions of the micro-op cache and clear corresponding inclusion fields responsive to a replacement or invalidation of a TLB entry whenever its associated inclusion field had been set.

Thus, such techniques may be useful to improve processing of instructions and reduce costs at least in terms of power consumption while also handling the complicated issues of inclusion and instruction restarts in a processor. As further described below implementation details of some techniques may also help to reduce costs in terms of circuit complexity.

These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than a restrictive sense and the invention measured only in terms of the claims and their equivalents.

Figure 1:
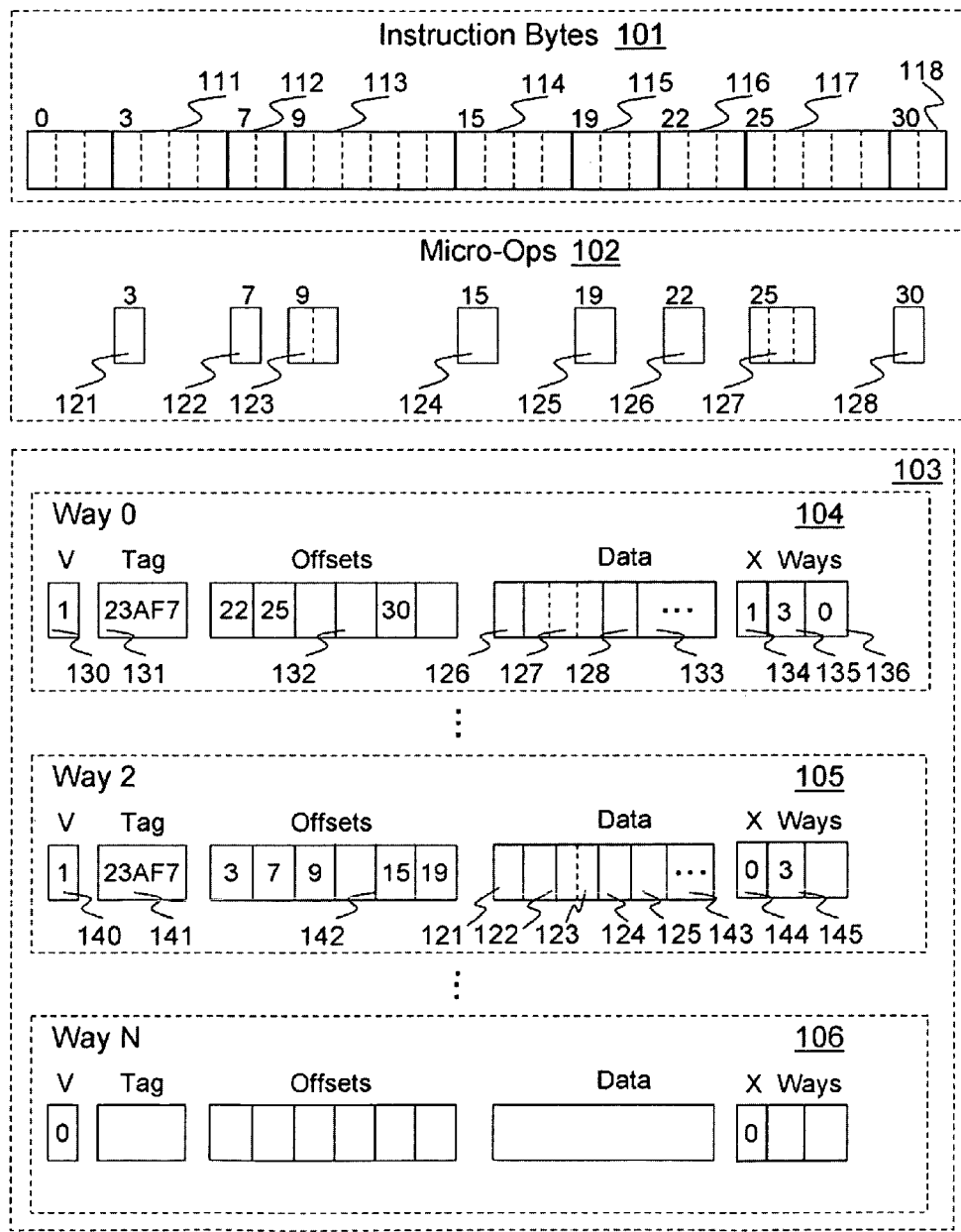
FIG. 1 illustrates one embodiment of a structure for coordinating instructions with corresponding micro-ops in a micro-op cache.

FIG. 1 illustrates one embodiment of an exemplary structure for coordinating instructions with corresponding micro-ops in a micro-op cache using sets of micro-op cache line access tuples. Instruction bytes 101 correspond to a particular window of addressable memory locations and may be chosen to include any fixed number of bytes. For example instruction bytes 101 could correspond to a 32-byte window of addressable memory locations or instruction pointers, each of which could be associated with a 5-bit byte position offset value. An example of instruction bytes 101 includes sequential macro-instructions 111-118; the first full instruction 111 starting at the third byte position of instruction bytes 101, the next instruction 112 starting at the seventh byte position, instruction 113 starting at the ninth byte position, instruction 114 starting at the fifteenth byte position, instruction 115 starting at the nineteenth byte position, instruction 116 starting at the twenty-second byte position, instruction 117 starting at the twenty-fifth byte position, and instruction 118 starting at the thirtieth byte position. It will be appreciated that it may be possible for an instruction 118 to extend beyond the boundary of instruction bytes 101 and/or beyond the boundary of an instruction cache line. Consideration of such situations is provided below in further detail.

Micro-ops 102 illustrate a set of micro-ops generated by decoding macroinstructions found within the window of instruction bytes 101. An example of micro-ops 102 includes: micro-op 121, corresponding to instruction 111 and so, with respect to the window of instruction bytes 101, having a byte position offset of 3; micro-op 122, corresponding to instruction 112 and so having a byte position offset of 7; two micro-ops 123, corresponding to instruction 113 and so having a byte position offset of 9; micro-op 124, corresponding to instruction 114 and so having a byte position offset of 15; micro-op 125, corresponding to instruction 115 and so having a byte position offset of 19; micro-op 126, corresponding to instruction 116 and so having a byte position offset of 22; three micro-ops 127, corresponding to instruction 117 and so having a byte position offset of 25; and micro-op 128, corresponding to instruction 118, and so having a byte position offset of 30.

In one embodiment of micro-op cache structure 103 micro-op cache lines are organized by sets and ways. For example, micro-op cache line 104 has way 0, micro-op cache line 105 has way 2, and micro-op cache line 106 has way N. For one embodiment, a set of lines or ways may include multiple lines or ways, all lines or ways in the set having the same tag. For an alternative embodiment, the set of micro-op cache lines may correspond to a multi-bit field in a virtual and/or physical memory address of a location storing the corresponding macroinstruction (e.g. instruction 111 of instruction bytes 101).

Therefore, it will be appreciated that multiple sets (e.g. having the same tag values) could occupy a larger fixed-sized set (e.g. having the same multi-bit field in an memory address) of ways in the micro-op cache, and that these design decisions may be made by those skilled in the art without departing from the principles of the present invention.

Multiple ways may be picked to store sequential micro-ops 102 for a set corresponding to a window of instruction bytes 101 in such a manner as to facilitate a simple sorting algorithm for sequentially sorting ways within a set to maintain the sequential order of micro-ops 102. Alternatively, since the ways in a set correspond to a single window of instruction bytes 101, the ways of a set may be sorted according to their smallest offsets.

It will be appreciated that since no instruction in the window of instruction bytes 101 can be smaller than one byte, permitting a set to have up to four ways, each way containing up to eight micro-ops would be sufficient to hold most combinations of decoded macroinstructions. In some embodiments practical observations may lead to reductions or to increases in the number of ways per set and/or the number of micro-ops per way. The number of ways per set may be reduced to three or to two in some embodiments, for example, to make sorting ways simpler and faster. The number of micro-ops per way may be reduced to six or to four in some embodiments, for example, to conserve unused micro-op storage within ways and/or to more closely match the number of micro-ops supported by a micro-op queue. Results of such decisions based on practical observations may or may not have a significant impact on micro-op cache hit or miss rates.

In some embodiments of micro-op cache structure 103, tag matching for instruction pointers may be decoupled from accessing micro-op cache lines in a data array through a queue to store micro-op cache line access tuples. A micro-op cache line access tuple, for example for cache line 104, may include a way 0, a valid bit 130, a tag 131 and offsets 132 and similarly for cache line 105, may include a way 2, a valid bit 140, a tag 141 and offsets 142. To access micro-ops corresponding to the macroinstruction 117, for example, a tag match for the instruction pointer produces a set of micro-op cache line access tuples, including the line access tuples for cache lines 104 and 105 since they have matching tags 131 and 141. The line access tuple in the set having an offset of 25, corresponding to the byte position of the instruction pointer for macroinstruction 117 with respect to the window of instruction bytes 101, may be used to access the three micro-ops starting in the second storage position of way 0 in the corresponding set of cache lines in a micro-op data array. In some embodiments of micro-op cache structure 103, tags may be linear (i.e. virtual) to avoid the need for a translation lookaside buffer (TLB) in the micro-op cache.

Thus the micro-op cache structure 103 uses sets of micro-op cache line access tuples, for example the set corresponding to tags 141 and 131 having offsets 142 and 132 respectively, to coordinate instructions 111-115 and 116-118 with corresponding micro-ops 121-125 and 126-128 stored in data portions 143 and 133 in a micro-op cache.

In some embodiments of micro-op cache structure 103, instruction-cache ways 145 and 135, indicating which ways store instructions corresponding to micro-ops in their respective micro-op cache lines are recorded for micro-op cache lines 105 and 104. In order to facilitate inclusion, self-modifying or cross-modifying code, and instruction restarts. It will be appreciated that: in response to a micro-op cache hit, e.g. at micro-op cache lines 105 and/or 104, instruction cache in-use indications associated with instructions 111-115 and/or 116-118 may be updated to indicate that their corresponding micro-ops 121-125 and/or 126-128 have been queued in an execution pipeline. Locating such instruction cache in-use indications associated with instructions 111-115 and/or 116-118 may be facilitated at least in part through use of the recorded instruction-cache ways 145 and 135 for micro-op cache lines 105 and 104.

In some embodiments of micro-op cache structure 103, where it may be possible for an instruction (e.g. instruction 118) to extend beyond the boundary of instruction bytes 101 and/or beyond the boundary of an instruction cache line, such conditions may be recorded for micro-op cache lines 104-106 in cross-line indication fields, X. For example cross-line indication 134 may be set for micro-op cache lines 104 to indicate that instruction 118 extended beyond the boundary of instruction bytes 101 and/or beyond the boundary of an instruction cache line. In such a case, instruction-cache way 136, indicating which way in the next instruction cache set stores the portion of instruction 118 that extended beyond the boundary may be recorded for micro-op cache line 104. Thus an instruction cache in-use indication associated with instruction 118 may be updated to indicate that its corresponding micro-op 128 has been queued in an execution pipeline.

On the other hand, since instruction 115 corresponding to micro-op 125 does not extend beyond the boundary of instruction bytes 101 and/or the boundary of an instruction cache line, cross-line indication 144 may be left unset for micro-op cache lines 105.

Figure 2:
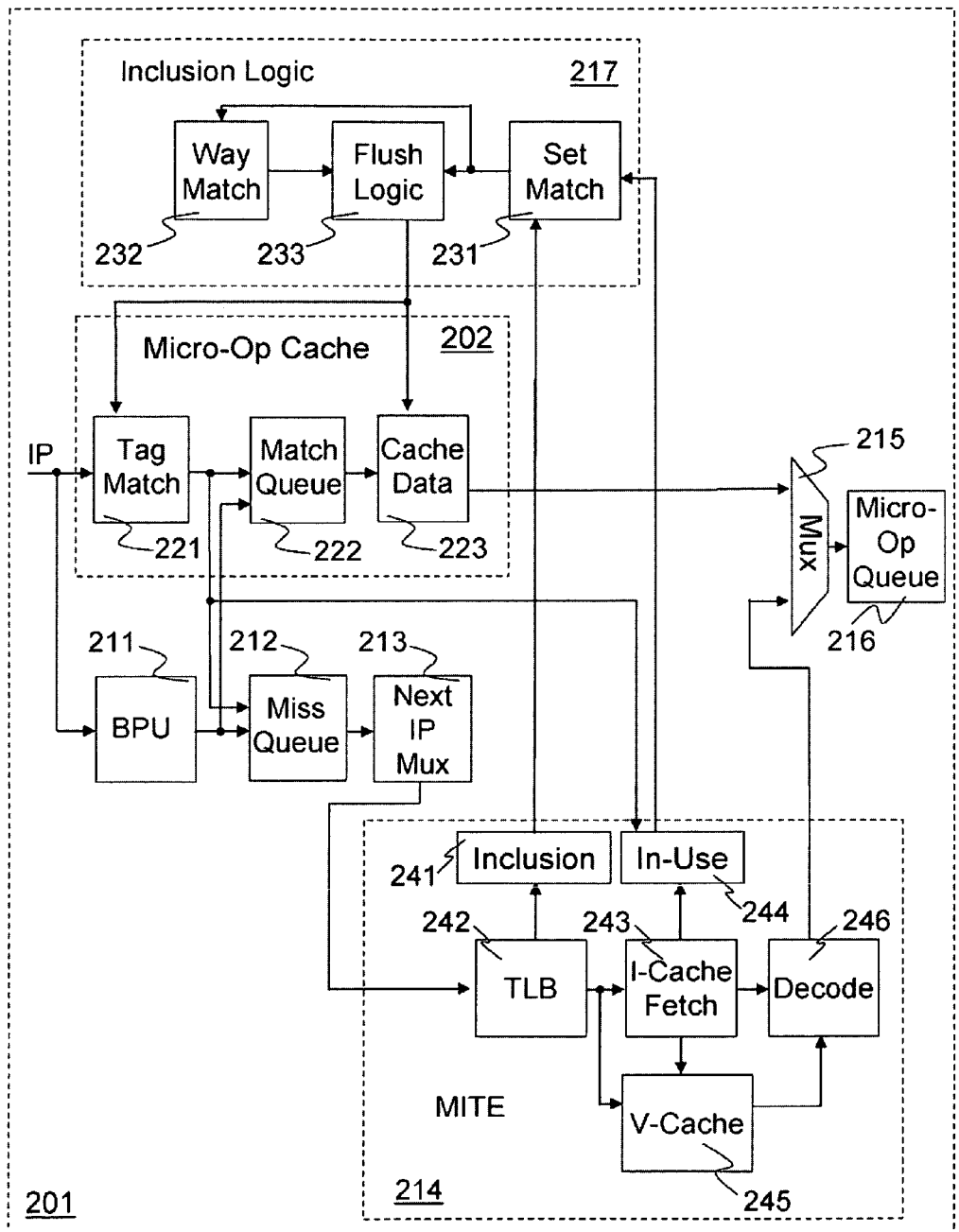
FIG. 2 illustrates one embodiment of an apparatus for handling inclusion and instruction restarts in a micro-op cache for a processor.

FIG. 2 illustrates one embodiment of an apparatus 201 for handling inclusion and instruction restarts in a micro-op cache 202 for a processor. Embodiments of apparatus 201 include tag match unit 221 to perform a tag match for an instruction pointer (IP) to retrieve a set of micro-op cache line access tuples, all of the line access tuples of the set having matching tags. In some alternative embodiments a branch prediction unit, BPU 211, may also retrieve instruction pointers. Retrieved micro-op cache line access tuples are stored in match queue 222, to be used to access cache data array 223. In some embodiments of cache data array 223, multiple line access tuples from the match queue can be used to concurrently access multiple cache lines in a micro-op cache data array 223 to retrieve sufficient micro-ops to supply micro-op queue 216.

When there is a micro-op cache 202 miss, macroinstruction translation engine, MITE 214, may be used for fetching and decoding macroinstructions to supply the micro-op queue 216. Instruction pointers from tag match unit 221 and/or BPU 211 may be stored in miss queue 212 and supplied by Next IP Mux 213 to MITE 214 for fetching macroinstructions following a micro-op cache 202 miss. In some embodiments of apparatus 201 portions of MITE 214 may be disabled to conserve power when there are no IP entries in the miss queue 212 and/or Next IP Mux 213. Likewise, micro-op cache data array 223 may be disabled to conserve power when there are no entries in match queue 222.

Of course since the additional number of steps for fetching and decoding macroinstructions in the MITE 214 to supply the micro-op queue 216 take longer than simply accessing micro-op cache data array 223 with cache line access tuples from match queue 222, some period of latency could be expected as a consequence of a micro-op cache 202 miss. But, it will be appreciated that when the number of micro-op cache line access tuples stored in match queue 222 at the time of a micro-op cache 202 miss is sufficiently large to oversupply line access tuples to micro-op cache data array 223, then the latency for switching to MITE 214 may be covered by a continued supply of micro-ops from the cache data array 223 to micro-op queue 216. For example, in some embodiments of micro-op cache 202, up to three micro-op cache line access tuples may be stored into match queue 222 per cycle, wherein up to two micro-op cache line access tuples may be used to concurrently access cache lines in micro-op cache data array 223. Thus match queue 222 would tend to fill up and to oversupply line access tuples to micro-op cache data array 223 thereby helping to cover the latency of a micro-op cache 202 miss.

In some embodiments of apparatus 201 portions of MITE 214 may be disabled to conserve power when there are no IP entries in the miss queue 212 and/or Next IP Mux 213. Likewise, micro-op cache data array 223 may be disabled to conserve power when there are no entries in match queue 222. It will be appreciated that since micro-op cache 202 hits and cache 202 misses are mutually exclusive, either the macroinstruction translation engine or the micro-op cache data array may be disabled for a substantial portion of time to conserve power. Thus, such techniques may be useful to improve processing of instructions and reduce costs at least in terms of power consumption in a processor. Of course in some embodiments of apparatus 201 there will be overlap, for example to cover the latency of MITE 214 or because MITE 214 may not access as large of a window of instruction bytes as tag match 221, but since MITE 214 may in general consume more power than micro-op cache data array 223, a reasonable micro-op cache hit rate would provide that MITE 214 could be disabled to conserve power for a significant portion of time when there are no entries in miss queue 212 and/or Next IP Mux 213.

In some alternative embodiments of apparatus 201 a synchronization flag may be set in the last micro-op retrieved from the micro-op cache data array 223 resulting from one or more micro-op cache 202 hits in response to the first subsequent micro-op cache 202 miss to indicate to Mux 215 where micro-ops from MITE 214 are to be merged with micro-ops retrieved from the micro-op cache data array 223 to be supplied to micro-op queue 216. Similarly, a synchronization flag may also be set in the last micro-op from MITE 214 resulting from one or more micro-op cache 202 misses in response to the first subsequent micro-op cache 202 hit. Therefore, the task of merging and synchronizing micro-op flows from micro-op cache 202 and from MITE 214 in Mux 215 may be substantially simplified, and it will be appreciated that details of such techniques may help to reduce costs in terms of circuit complexity.

MITE 214 includes TLB 242, instruction-cache fetch 243 and decode 246 for fetching and decoding macroinstructions to supply the micro-op queue 216. Some embodiments of micro-op cache 202 include micro-op cache lines having way storage fields to record an instruction-cache way storing the corresponding macroinstructions. Embodiments of MITE 214 also include victim-cache 245 and instruction-cache in-use indications 244 associated with the corresponding macroinstructions, the in-use indications 244 to be updated, responsive to micro-op cache hits at corresponding micro-op cache lines, and locatable through use of the instruction-cache way recorded in the way storage fields for the first micro-op cache lines of micro-op cache 202.

In some embodiments of MITE 214, micro-op cache inclusion 241 fields associated with TLB 242 entries are set responsive to accessing the TLB 242 entries. Inclusion logic 217 is coupled with micro-op cache 202, inclusion 241 fields and TLB 242. Inclusion logic 217 includes flush logic 233 to flush a micro-op cache 202 portion and clear inclusion 241 fields for the micro-op cache 202 portion responsive to replacement or invalidation of TLB 242 entries whenever the micro-op cache 202 portion's inclusion 241 fields associated with the replaced or invalidated TLB entries were set. In some embodiments it may be cost effective to flush the entire micro-op cache.

Inclusion logic 217 is also coupled with micro-op cache 202, in-use indications 244 and instruction-cache fetch 243 to locate and evict micro-op cache 202 lines corresponding to recorded instruction-cache ways in their way storage fields, responsive to the eviction of the instruction-cache ways from the instruction-cache. Inclusion logic 217 includes set match logic 231 to identify a set of micro-op cache lines including micro-op cache lines corresponding to the evicted instruction-cache ways, and way match logic 232 to match the evicted instruction-cache ways with recorded instruction-cache ways in the way storage fields of micro-op cache lines in the set identified by match logic 231. Way match logic 232 is operatively coupled with flush logic 233 to identify which micro-op cache lines to evict or flush from among the set. It will be appreciated that the identified set may include more than one micro-op cache set.

It will be also appreciated that such techniques may be useful to improve processing of instructions and reduce costs in terms of power consumption and circuit complexity in a processor while also handling the complicated issues of inclusion and instruction restarts in the front-end pipeline of a processor.

Figure 3:
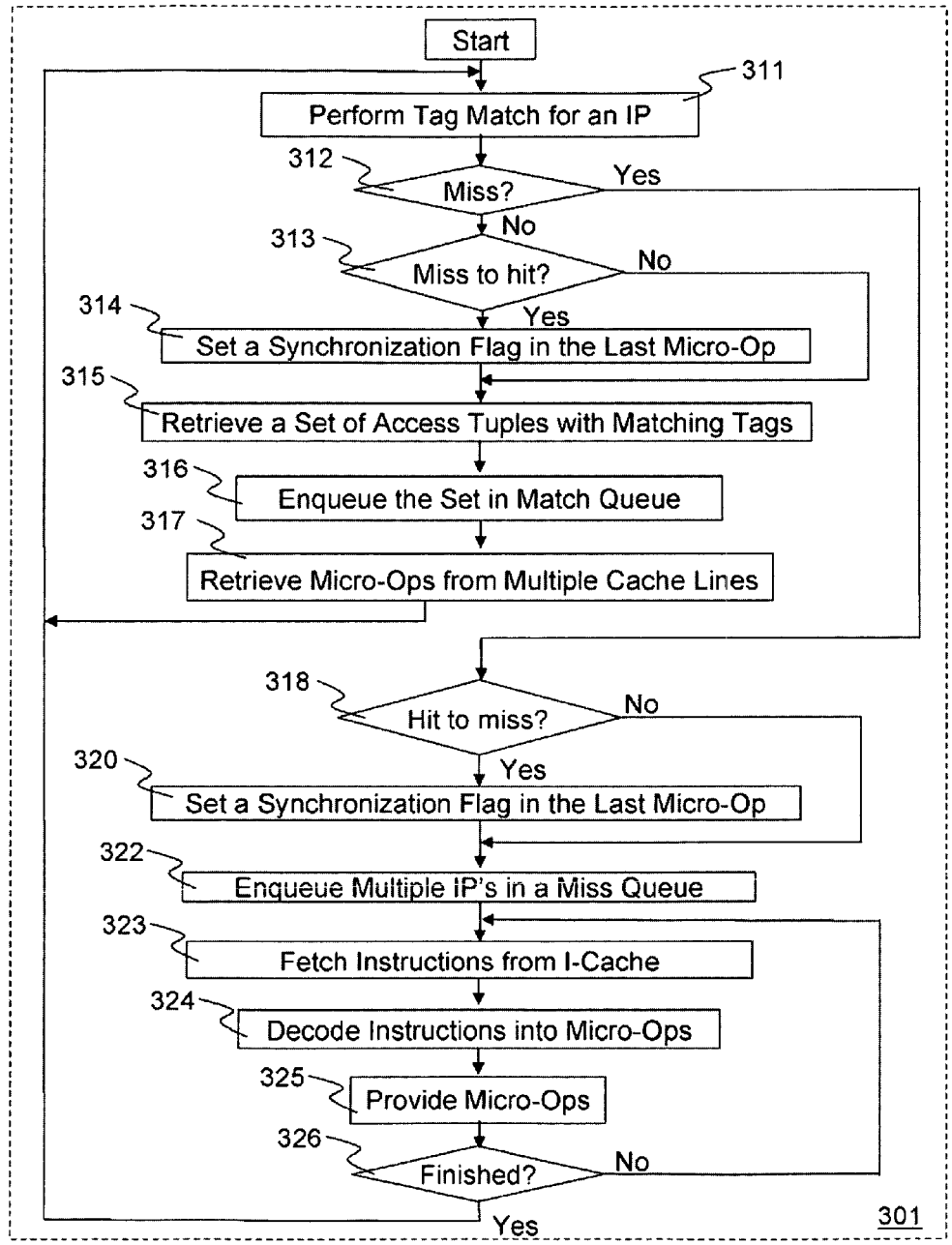
FIG. 3 illustrates a flow diagram for a process to use a micro-op cache in a processor.

FIG. 3 illustrates a flow diagram for a process 301 to use a micro-op cache in a processor. Process 301 and other processes herein disclosed are performed by processing blocks that may comprise dedicated hardware or software or firmware operation codes executable by general purpose machines or by special purpose machines or by a combination of both.

In processing block 311 a tag match for an instruction pointer is performed. If a micro-op cache miss is detected in processing block 312 then processing proceeds to processing block 318. Otherwise processing continues in processing block 313 where it is determined if the micro-op cache hit is the first hit following one or more misses, in which case in processing block 314 where a synchronization flag is set in the last micro-op from the macroinstruction translation engine preceding the micro-op cache hit. If the micro-op cache hit is not the first hit following one or more misses, the processing skips directly to processing block 315 where a set of micro-op cache line access tuples having matching tags is retrieved. Then in processing block 316 the set of micro-op cache line access tuples is stored or enqueued in a match queue. In processing block 317 micro-op cache line access tuples from the match queue are used to concurrently access multiple cache lines in a micro-op cache data array to retrieve micro-ops, which may then be supplied to a micro-op queue. Processing then repeats in processing block 311.

Now if a micro-op cache miss is detected in processing block 312 then processing would proceed to processing block 318 where it is determined if the micro-op cache miss is the first miss following one or more hits, in which case in processing block 320 a synchronization flag is set in the last micro-op retrieved from the micro-op cache data array preceding the miss. If the micro-op cache miss is not the first miss following one or more hits, the processing skips directly to processing block 322 where multiple instruction pointers are stored or enqueued in a miss queue responsive to the micro-op cache miss. Now starting in processing block 323 an instruction cache is accessed using instruction pointers from the miss queue to fetch or retrieve instructions. In processing block 324 instructions are decoded to produce micro-ops to supply a micro-op queue. The micro-ops are also provided in processing block 325 to fill one or more ways in a set in the micro-op cache. In processing block 326, if processing instruction pointers enqueued in processing block 322 in the miss queue is not finished processing repeats starting in processing block 323. Otherwise processing returns to processing block 311.

It will be appreciated that while certain processing blocks of process 301 and other processes herein disclosed may be performed by different individual units and/or in different pipelines of apparatus 201, many of the processing blocks of process 301 and other processes herein disclosed may, in practice, be performed concurrently.

Figure 4:
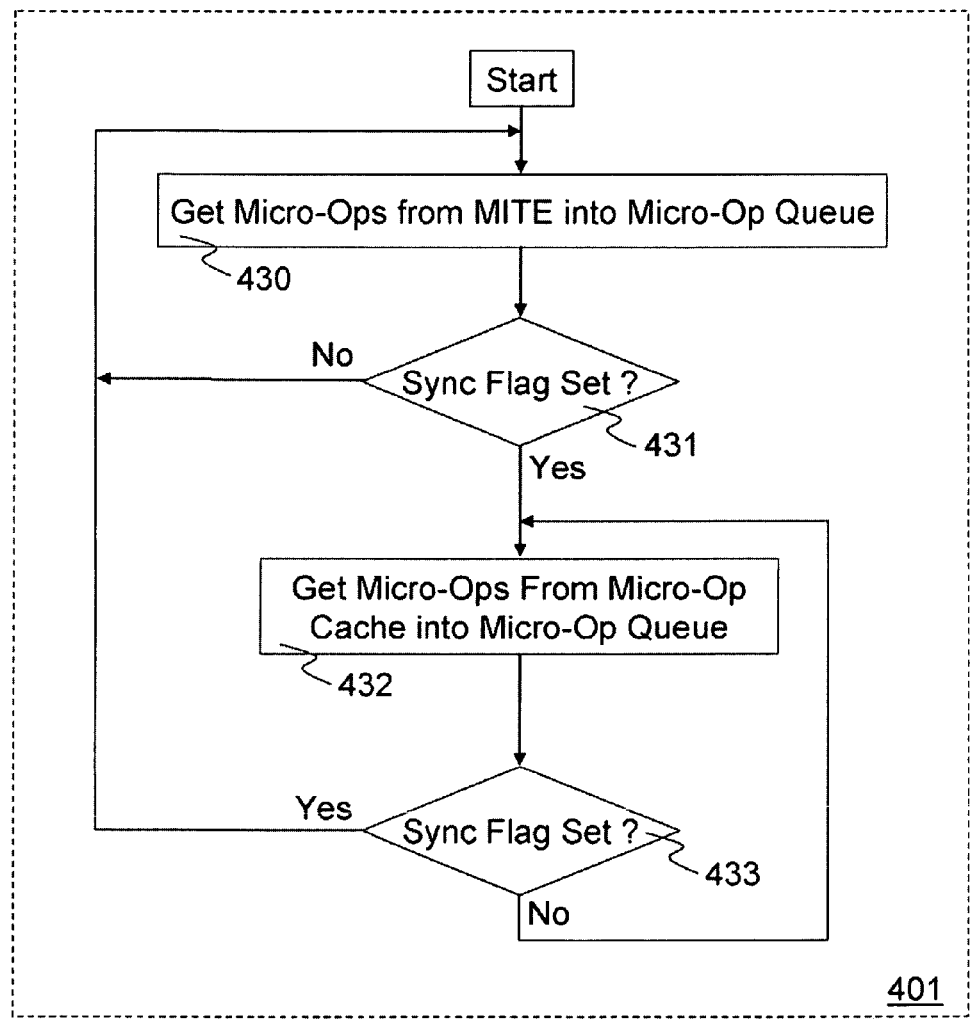
FIG. 4 illustrates a flow diagram for a process to synchronize micro-op flows from a micro-op cache and from a macroinstruction translation engine in a processor.

FIG. 4 illustrates a flow diagram for a process 401 to synchronize micro-op flows coming from a micro-op cache and from a macroinstruction translation engine in a processor. In processing block 430 micro-ops are retrieved from the macroinstruction translation engine and delivered into the micro-op queue in sequential groups. In processing block 431 it is determined if the synchronization flag was set in the last micro-op retrieved from the macroinstruction translation engine. If not processing repeats in processing block 430. Otherwise processing proceeds to processing block 432 where micro-ops are retrieved from the micro-op cache and delivered into the micro-op queue in sequential groups. In processing block 433 it is determined if the synchronization flag was set in the last micro-op retrieved from the micro-op cache. If not processing repeats in processing block 432. Otherwise processing returns to processing block 430. Thus the mux 215 may provide the synchronized sequential micro-op flows coming from the micro-op cache and from the macroinstruction translation engine into the micro-op queue 216.

Figure 5:
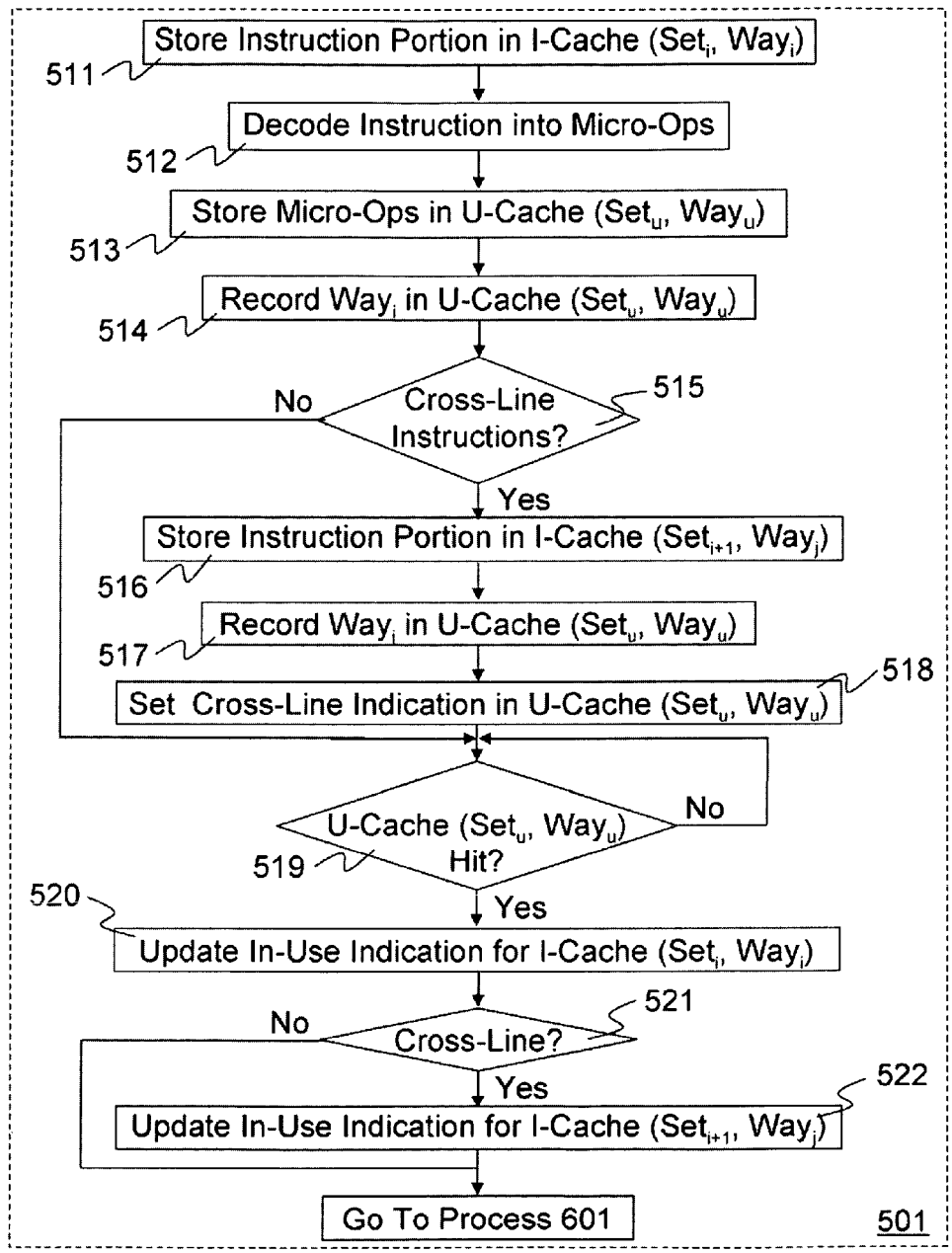
FIG. 5 illustrates a flow diagram for one embodiment of a process to maintain an instruction-cache in-use indication through use of the instruction-cache way recorded for the micro-op cache line.

FIG. 5 illustrates a flow diagram for one embodiment of a process 501 to maintain an instruction-cache in-use indication through use of the instruction-cache ways (e.g. as stored by way 135 or way 136) recorded for the micro-op cache line (e.g. as in micro-op cache line 103). In processing block 511, an instruction portion is stored in an instruction-cache line at $set_i$ in $way_i$. In most cases the instruction portion will be the entire instruction, but as described above with regard to FIG. 1, it may be possible for an instruction (e.g. instruction 118) to extend beyond the boundary of an instruction cache line. In processing block 512, the instruction is decoded into one or more micro-ops, at least some of which, in processing block 513, are stored into a micro-op cache line at $set_n$ in $way_n$.

For some embodiments, a set of lines or ways in a micro-op cache may include all the lines or ways in the set that have the same tag values. Alternatively a set of micro-op cache lines may correspond to a multi-bit field in a virtual and/or physical memory address of a location storing the corresponding macroinstruction. For example, in a virtually indexed micro-op cache (i.e. using virtual addresses) where an instruction cache is physically indexed (i.e. using physical addresses), multi-bit fields from the matching least significant portion of address bits of both addresses may be used to identify fixed-sized sets of ways in both caches. For some embodiments the instruction-cache $way_i$ corresponds to a way allocated according to a least-recently-used process in the instruction-cache to hold an instruction-cache line including the instruction. For some alternative embodiments the instruction-cache $way_i$ may also correspond to a multi-bit field from the matching least significant portion of virtual and/or physical memory address bits.

In processing block 514, instruction-cache $way_i$ storing the instruction corresponding to the one or more micro-ops is recorded for the micro-op cache line at $set_n$ in $way_n$. In processing block 515 a determination is made whether the instant instruction is a cross-line instruction in the instruction cache. If so in processing block 516, another instruction portion is stored in the instruction-cache line at $set_{i+1}$ in some $way_j$; in processing block 517, the next instruction-cache $way_i$ is also recorded for the micro-op cache line at $set_n$ in $way_n$; and in processing block 518, a cross-line indication is set for the micro-op cache line at $set_n$ in $way_n$ to indicate that the instant instruction crosses an instruction-cache line boundary. Otherwise processing skips to processing block 519.

In processing block 519 processing waits for a micro-op cache hit for the micro-op cache line at $set_n$ in $way_n$. Whenever such a micro-op cache hit occurs processing proceeds in processing block 520 where an in-use indication associated with an instruction-cache line at $set_i$ in $way_i$ containing the corresponding macroinstruction is updated. Next if it is determined in processing block 521, that a cross-line indication is set for the micro-op cache line at $set_n$ in $way_n$ then in processing block 522 an in-use indication is updated for the instruction-cache line at $set_{i+1}$ in $way_j$. Thus upon a micro-op cache hit, the in-use indication(s) associated with the corresponding macroinstruction may be located in the instruction cache by using the instruction-cache way(s) recorded for the micro-op cache line that hits. Processing then proceeds to process 601.

Figure 6:
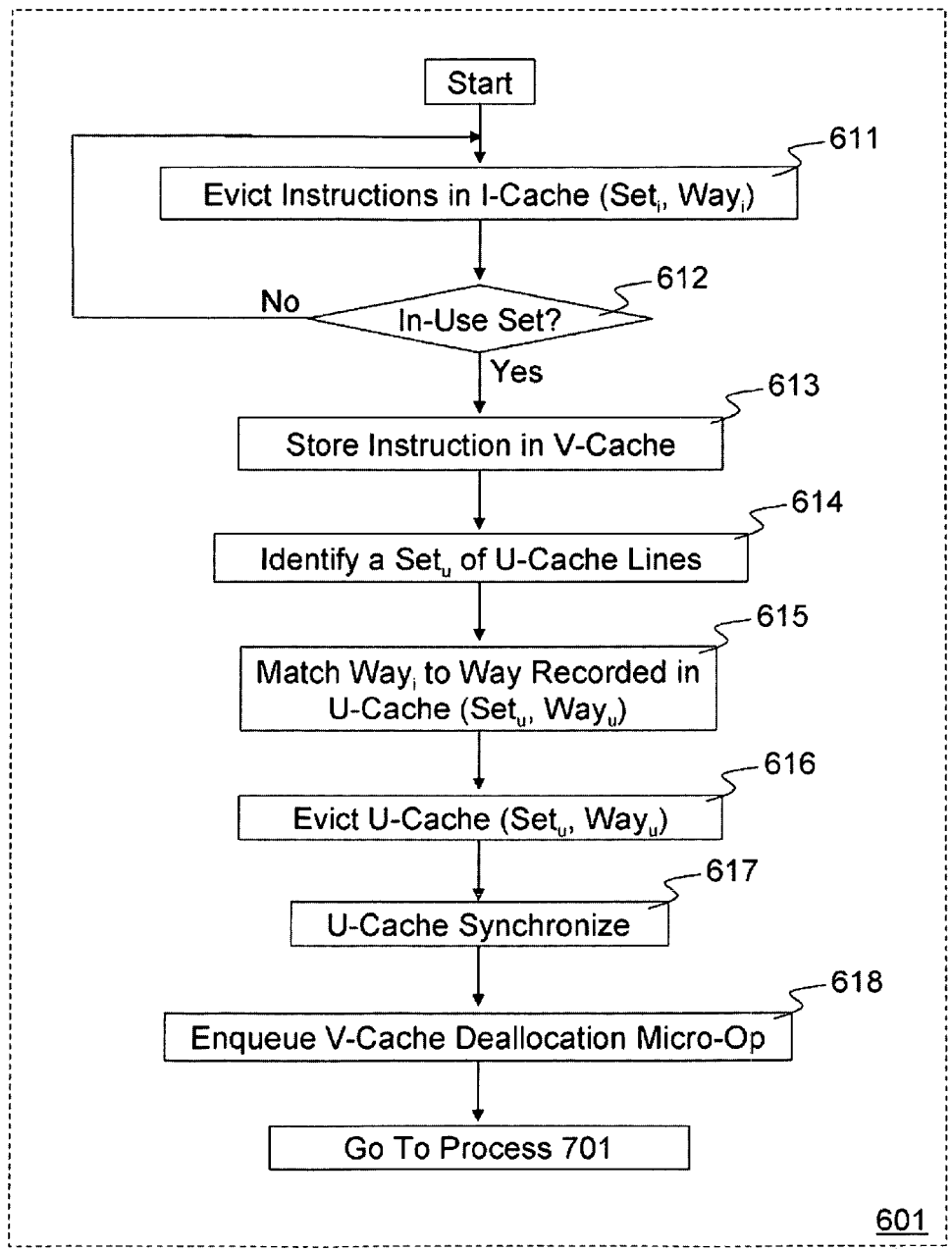
FIG. 6 illustrates a flow diagram for one embodiment of a process to handle inclusion and instruction restarts in a micro-op cache for a processor.

FIG. 6 illustrates a flow diagram for one embodiment of a process 601 to handle inclusion and instruction restarts in a micro-op cache for a processor. In processing block 611, an eviction of instructions in the instruction cache line at $set_i$ in $way_i$ occurs. In processing block 612 it is determined if the corresponding in-use indication bit is set. If not processing continues in processing block 611, but if the corresponding in-use indication is set, processing proceeds to processing block 613. In processing block 613 the evicted line of instructions is stored in the victim cache.

In processing block 614 a set of micro-op cache lines including micro-op cache line(s) corresponding with the evicted line of instructions is identified. It will be appreciated that the identified set in processing block 614 may include more than one micro-op cache set. For example, if an instruction-cache line can hold twice as many instructions as the corresponding micro-ops, which would fit into one micro-op cache set, then the set as identified in processing block 614 may include two micro-op cache sets. Furthermore as described above with regard to FIG. 1, it may be possible for an instruction (e.g. instruction 118) to extend beyond the boundary of an instruction cache line. Therefore micro-ops in a third micro-op cache set, may also correspond to an instruction partially stored in a particular instruction-cache line. Accordingly a next instruction-cache way (e.g. way 136) may be recorded for a micro-op cache line in the micro-op cache set n−1, and the same instruction-cache way may be recorded for micro-op cache lines in the micro-op cache sets n and n+1.

In processing block 615 the instruction-cache way(s) recorded for the micro-op cache lines are matched with instruction cache $way_i$ storing the evicted instructions to identify a micro-op cache line at $set_n$ in $way_n$ to evict or flush from among the set of micro-op cache lines identified in processing block 614. In some embodiments multiple micro-op cache ways in a particular micro-op cache set, or in multiple micro-op cache sets may all record the matching instruction cache $way_i$. In some alternative embodiments $way_i$ may represent a multi-bit (e.g. 2-bit) field in a virtual and/or physical memory address of a location storing the corresponding macroinstruction may be matched to multiple micro-op cache ways in a particular micro-op cache set, or in multiple micro-op cache sets to identify a micro-op cache line at $set_n$ in $way_n$ to evict or flush. In processing block 616, the micro-op cache line at $set_n$ in $way_n$ is evicted or flushed from the micro-op cache responsive to the eviction from the instruction-cache. Now, in some embodiments, another subsequent eviction from the instruction-cache may require more quickly evicting or flushing micro-op cache lines from the micro-op cache, in which case the entire set identified in processing block 614 may be immediately flushed.

In some embodiments, it may be possible for a micro-op to be supplied to the micro-op queue 216 prior to the flush of its micro-op cache line from the micro-op cache in processing block 616, but following an insertion of a victim-cache deallocation micro-op. For this reason, in processing block 617 a micro-op synchronization is performed (e.g. a micro-op cache miss synchronization as in processing blocks 318-320 and 313-314 may be forced). Then in processing block 618 a victim-cache deallocation micro-op is enqueued following the micro-op cache synchronization to indicate, upon sequential retirement of victim-cache deallocation micro-op, that none of the instructions of the evicted instruction cache line are still in use. Thus process 601 ensures correct handling of pipeline inclusion and instruction restarts in a micro-op cache Processing then proceeds to process 701.

In some processing systems coherency between the TLB (translation look-aside buffer) in cache and page tables in memory must be maintained. For example, if the operating system changes an attribute of a page, it may need to invalidate the page from the TLB. When such an invalidation occurs, all micro-op cache lines associated with the invalidated page may need to be flushed. Since such events are rather rare, one option may be to simply flush the entire micro-op cache.

In the case of front-end restarts, a restarted instruction my generate a fatal error if it encounters a TLB miss. Therefore when a particular TLB entry is replaced due to a TLB miss, any micro-op cache lines containing micro-ops that were generated from instructions corresponding to the replaced TLB entry may need to be flushed.

Figure 7:
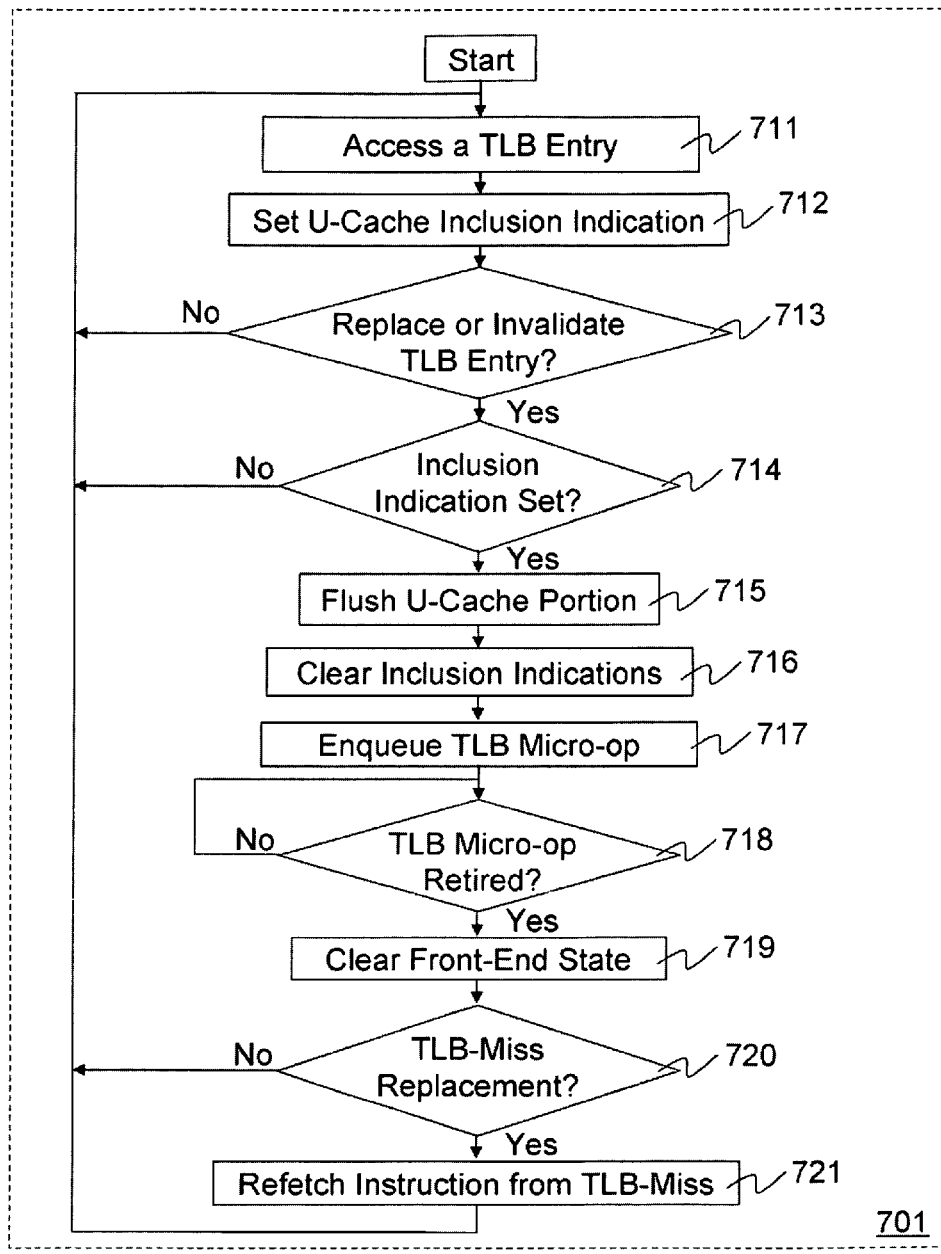
FIG. 7 illustrates a flow diagram for one embodiment of a process to maintain inclusion of TLB (translation look-aside buffer) entries in a micro-op cache for a processor.

FIG. 7 illustrates a flow diagram for one embodiment of a process 701 to maintain inclusion of TLB entries in a micro-op cache for a processor. In processing block 711 a TLB entry is accessed. In processing block 712 a micro-op cache portion inclusion indication associated with the TLB entry is set. It will be appreciated that in some embodiments the micro-op cache portion may be the entire micro-op cache, while in other embodiments the micro-op cache portion may be a set, or a grouping of sets, or some fraction of the micro-op cache. In processing block 713 processing waits for a TLB entry to be replaced or invalidated. Until such replacement or invalidation occurs, processing continues to access TLB entries and set inclusion indications. Whenever a TLB entry is invalidated or replaced, a determination is made in processing block 714 whether an inclusion indication has been set corresponding to that TLB entry. If not, processing continues to access TLB entries and set inclusion indications until another TLB entry is replaced or invalidated, but if the inclusion indication has been set, processing proceeds to processing block 715.

In processing block 715 the corresponding micro-op cache portion is flushed to maintain inclusion of the replaced or invalidated TLB entry. Then in processing block 716 inclusion indications for that micro-op cache portion are cleared. It will be appreciated that if TLB entry replacements or invalidations are rare events, in some embodiments it may be cost effective to simply flush the entire micro-op cache when such rare events occur. Next in processing block 717 a TLB micro-op is enqueued to indicate, upon sequential retirement of the TLB micro-op, that none of the micro-ops associated with the replaced or invalidated TLB entry are still in use. In some embodiments of process 701, different types of TLB micro-ops may be used for different TLB replacements (e.g. in TLB-misses) or invalidations (e.g. in TLB page invalidations). In processing block 718 processing waits for the TLB micro-op to be retired, and upon retirement of the TLB micro-op processing proceeds to processing block 719 where the front-end pipeline state is cleared. It will be appreciated that clearing the front end state may be performed in a number of ways, including but not limited to flushing the front end state upon retirement of the TLB micro-op, or stopping the front end and/or clearing the MITE 214. Then in processing block 720 it is determined whether the replacement or invalidation of the TLB entry resulted from a TLB-miss, in which case the instruction from the TLB miss is refetched in processing block 721 after clearing the front-end pipeline state. In the case where invalidation of the TLB entry did not result from a TLB-miss (e.g. in a TLB page invalidation) the cleared (i.e. flushed or stopped) front end may be restarted or continue processing at the next linear instruction pointer following the TLB page invalidation. In any case processing then returns to processing block 711.

While certain processing blocks of process 501, 601, 701 and other processes herein disclosed may be performed by different individual units and/or in different pipelines of apparatus 201, many of the processing blocks of process 501, 601, 701 and other processes herein disclosed may, in practice, be performed concurrently. It will be appreciated from the above description that processes 301, 401, 501 601 and 701 as described herein may provide effective techniques for employing cached micro-ops to improve processing performance of instructions and reduce costs in terms of circuit complexity and power consumption while also handling the complicated issues of inclusion and instruction restarts in the front-end pipeline of a processor.

The above description is intended to illustrate preferred embodiments of the present invention. From the discussion above it should also be apparent that especially in such an area of technology, where growth is fast and further advancements are not easily foreseen, the invention can may be modified in arrangement and detail by those skilled in the art without departing from the principles of the present invention within the scope of the accompanying claims and their equivalents.

What is claimed is:

1. A method for maintaining inclusion of a TLB (translation lookaside buffer), the method comprising:
   accessing a particular TLB entry of a plurality of TLB entries;
   responsive to accessing the particular TLB entry, setting an inclusion indication associated with the particular TLB entry to indicate that one or more micro-operations (micro-ops) derived from the particular TLB entry are included in a portion of a micro-op cache, the inclusion indication separate from valid bits, each of the valid bits corresponding to a unique line of the micro-op cache;
   responsive to a replacement or an invalidation of the particular TLB entry, if the inclusion indication associated with the particular TLB entry was set:
     flushing the micro-op cache portion including the one or more micro-ops derived from the particular TLB entry; and
     clearing a set of inclusion indications associated with a set of TLB entries, wherein a set of micro-ops derived from the set of TLB entries is included in the micro-op cache portion.

2. The method of claim 1, wherein the inclusion indication is separate from in-use indications, each of the in-use indications corresponding to a unique way of an instruction-cache.

3. The method of claim 1 wherein the micro-op cache portion is a fraction of the micro-op cache.

4. The method of claim 3 wherein the fraction of the micro-op cache associated with the TLB entry comprises one or more sets of micro-op cache lines.

5. The method of claim 1 further comprising:
   enqueuing a TLB-miss micro-op to indicate on retirement that none of the micro-ops associated with the replaced or invalidated TLB entry are still in use; and
   flushing a front-end pipeline state in response to a retirement of the TLB-miss micro-op.

6. The method of claim 5 further comprising:
   refetching an instruction corresponding to a TLB miss after flushing the front-end pipeline state.

7. The method of claim 5 further comprising:
   restarting the front-end pipeline at a next sequential instruction following a TLB invalidation after flushing the front-end pipeline state.

8. An apparatus for maintaining inclusion of an entry of a TLB (translation look-aside buffer) in a processor, the apparatus comprising:
   a micro-operation (micro-opt cache to store micro-ops for execution by the processor;
   an inclusion field associated with a particular TLB entry of a plurality of TLB entries, the inclusion field set, responsive to accessing the particular TLB entry, to indicate that one or more micro-ops derived from the particular TLB entry are included in a portion of a micro-op cache, the inclusion field separate from valid bits, each of the valid bits corresponding to a unique line of the micro-op cache portion; and
   inclusion logic coupled with the micro-op cache and the TLB, the inclusion logic to, in response to a replacement or an invalidation of the particular TLB entry, if the inclusion indication associated with the particular TLB entry was set:
     flush the micro-op cache portion including the one or more micro-ops derived from the particular TLB entry, and
     clear each of a plurality of inclusion fields associated with a set of TLB entries, wherein a set of micro-ops derived from the set of TLB entries is included in the micro-op cache portion.

9. The apparatus of claim 8, wherein the inclusion indication is separate from in-use indications, each of the in-use indications corresponding to a unique way of an instruction-cache.

10. The apparatus of claim 8 wherein the micro-op cache portion is a fraction of the micro-op cache.

11. The apparatus of claim 10 wherein the fraction of the micro-op cache associated with the TLB entry comprises one or more sets of micro-op cache lines.

12. The apparatus of claim 8 further comprising:
    a micro-op queue to enqueue a TLB-miss micro-op; and
    said inclusion logic to flush a front-end pipeline state in response to a retirement of the TLB-miss micro-op.

13. The apparatus of claim 12 further comprising:
    a macroinstruction translation engine to refetch an instruction corresponding to a TLB miss after flushing the front-end pipeline state.

14. The apparatus of claim 12 wherein the front-end pipeline is to restart at a next sequential instruction following a TLB invalidation after flushing the front-end pipeline state.

15. An article of manufacture including a non-transitory machine readable storage medium, said non-transitory machine readable storage medium storing state and/or executable data, which when accessed by one or more machines causes said one or more machines to:

access a particular TLB (translation lookaside buffer) entry of a plurality of TLB entries;
responsive to accessing the particular TLB entry, set an inclusion indication associated with the particular TLB entry to indicate that one or more micro-operations (micro-ops) derived from the particular TLB entry are included in a portion of a micro-op cache, the inclusion indication separate from valid bits, each of the valid bits corresponding to a unique line of the micro-op cache portion;
in response to a replacement or an invalidation of the particular TLB entry, if the inclusion indication associated with the particular TLB entry was set:
flush the micro-op cache portion including the one or more micro-ops derived from the particular TLB entry; and
clear each of a plurality of inclusion indications associated with a set of TLB entries, wherein a set of micro-ops derived from the set of TLB entries is included in the micro-op cache portion.

16. The article of manufacture of claim 15, said non-transitory machine readable storage medium storing state and/or executable data, which when accessed by one or more machines causes said one or more machines to:
enqueue a TLB-miss micro-op; and
responsive to a retirement of the TLB-miss micro-op, flush a front-end pipeline state.

17. The article of manufacture of claim 16, said non-transitory machine readable storage medium storing state and/or executable data, which when accessed by one or more machines causes said one or more machines to:
refetch an instruction corresponding to a TLB miss after flushing the front-end pipeline state.

18. The article of manufacture of claim 15, said non-transitory machine readable storage medium storing state and/or executable data, which when accessed by one or more machines causes said one or more machines to:
restart the front-end pipeline at a next sequential instruction following a TLB invalidation.

19. The article of manufacture of claim 15 wherein the micro-op cache portion is the entire micro-op cache.

20. The article of manufacture of claim 15, wherein the inclusion indication is separate from in-use indications, each of the in-use indications corresponding to a unique way of an instruction-cache.

* * * * *